(12) United States Patent
Kwon

(10) Patent No.: US 6,195,397 B1
(45) Date of Patent: Feb. 27, 2001

(54) SIGNAL TRANSMISSION AND RECEPTION DEVICE FOR NEW WIRING SYSTEM

(75) Inventor: Oh Kyong Kwon, Seoul (KR)

(73) Assignee: Hyundai Electronics Co., Ltd., Ichon (KR)

( * ) Notice: Subject to any disclaimer, the term of this patent is extended or adjusted under 35 U.S.C. 154(b) by 0 days.

(21) Appl. No.: 09/071,896

(22) Filed: May 5, 1998

(30) Foreign Application Priority Data

May 10, 1997 (KR) .................................................. 97/18460

(51) Int. Cl.[7] ....................... H04L 25/34; H03K 19/0175
(52) U.S. Cl. ............................................... 375/288; 326/80
(58) Field of Search ..................................... 375/257, 286, 375/288, 287, 259, 219; 326/80, 30, 104, 105, 136

(56) References Cited

U.S. PATENT DOCUMENTS

| | | | |
|---|---|---|---|
| 5,600,634 | * 2/1997 | Satoh et al. ............................ | 270/294 |
| 5,761,246 | * 6/1998 | Cao et al. .............................. | 375/287 |
| 5,864,584 | * 1/1999 | Cao et al. .............................. | 375/244 |

OTHER PUBLICATIONS

"Current–Mode CMOS Multiple–Valued Logic Circuits", K. Wayne Current, IEEE Journal of Solid–State Circuits, vol. 29, No. 2, Feb. 1994, pp. 95–107.

* cited by examiner

Primary Examiner—Stephen Chin
Assistant Examiner—Albert Park
(74) Attorney, Agent, or Firm—Fleshner & Kim, LLP

(57) ABSTRACT

Signal transmission and reception device for a new wiring system, is disclosed, in which a plurality of different signals are transmitted at a time between a plurality of function blocks in an integrated circuit through one signal transmission line, for reducing area occupied by wiring, including one signal transmission line fitted between the function blocks for transmission of signals, a driving circuit for receiving signals from the function blocks through a plurality of internal signal lines, converting combinations of transitions of the signals into encoded signals, and providing the encoded signal to the signal transmission line, and a reception circuit for receiving the encoded signal transmitted from the driving circuit through the signal transmission line, decoding the encoded signal into the original plurality of signals, and providing the original plurality of signals to another plurality of function blocks through a plurality of internal signal lines.

23 Claims, 12 Drawing Sheets

SIGNAL TRANSMISSION AND RECEPTION DEVICE FOR NEW WIRING SYSTEM

BACKGROUND OF THE INVENTION

1. Field of the Invention

The present invention relates to a signal transmission and reception device for an integrated circuit, and more particularly, to a signal transmission and reception device for a new wiring system in which a plurality of different signals generated between two functional blocks in an integrated circuit are transmitted on a signal transmission line.

2. Discussion of the Related Arts

Currently, as production techniques of integrated circuits are developed, a number of transistors included in one chip sharply increases. Particularly, as submicron devices are developed, the number of wiring, not only for local interconnections, but also for interconnections between functional blocks sharply increases, increasing a relative importance of the wiring in the entire chip region very high. To solve this problem, layers are stacked for easy of the wiring, which causes problems of difficulty in fabrication and a low yield coming from the multiple layer.

To reduce such wirings, employment of a multiple-valued logic may be considered, in which a signal is made to carry plural signals, disclosed in detail in [K. Wayne Current, "Current-Mode CMOS Multiple-Valued Logic Circuits", IEEE J. Solid-States Circuits, vol. 29, No. 2, pp. 95–107 February 1994]. In order to employ such a multiple-valued logic, all the functional blocks in the integrated circuit should be re-designed in conformity with the multiple-valued logic. That is, application of the multiple-valued logic to an existing digital circuit design is difficult and has a large power consumption. Therefore, it is necessary to develop a method in which wiring can be reduced while an internal circuit design of an integrated circuit is not changed for reducing an area of the integrated circuit, and a structure of less layers can be employed as the wiring is reduced form a simple fabrication process of the integrated circuit.

SUMMARY OF THE INVENTION

Accordingly, the present invention is directed to a signal transmission and reception device for a new wiring system that substantially obviates one or more of the problems due to limitations and disadvantages of the related art.

An object of the present invention is to provide a signal transmission and reception device for a new wiring system, which can reduce an area occupied by wiring.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the signal transmission and reception device for a new wiring system which is for transmission of data between a plurality of function blocks in an integrated circuit, includes one signal transmission line fitted between the function blocks for transmission of signals, a driving circuit for receiving signals from the function blocks through a plurality of internal signal lines, converting combinations of transitions of the signals into encoded signals, and providing the encoded signal to the signal transmission line, and a reception circuit for receiving the encoded signal transmitted from the driving circuit through the signal transmission line decoding the encoded signal into the original plurality of signals, and providing the original plurality of signals to another plurality of function blocks through a plurality of internal signal tines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
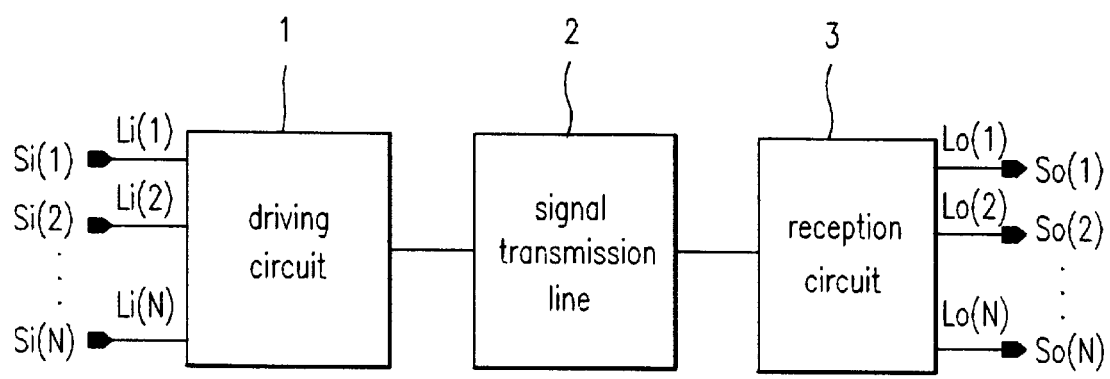
FIG. 1 illustrates a block diagram of a signal transmission and reception device for a new wiring system in accordance with a preferred embodiment of the present invention.

Reference will now be made in detail to the preferred embodiments of the present invention, examples of which are illustrated in the accompanying drawings. FIG. 1 illustrates a block diagram of a signal transmission and reception device for a new wiring system in accordance with a preferred embodiment of the present invention.

Referring to FIG. 1, the signal transmission and reception device for a new wiring system in accordance with a preferred embodiment of the present invention includes a driving circuit 1, one signal transmission line 2 and a reception circuit 3. Signals Si(1)~Si(N) are signals different from each other to be transmitted from on function block(not shown) to another function block(not shown) through internal signal lines Li(1)~Li(N) in a integrated circuit. The driving circuit(1) receives signals Si(1)~Si(N) through a plurality of internal signal lines Li(1)~Li(N) in a function block, encodes the signals Si(1)~Si(N), and provides the encoded signals through one signal transmission line 2. The reception circuit 3 decodes the encoded signals received through the one signal transmission line 2, restores into signals So(1)~So(N) in states identical to the states of the original signals Si(1)~S(N) received at the driving circuit 1, and provides the restored signals So(1)~So(N) to other function blocks(not shown) through a plurality of internal signal lines Lo(1)~Lo(N).

Figure 2:
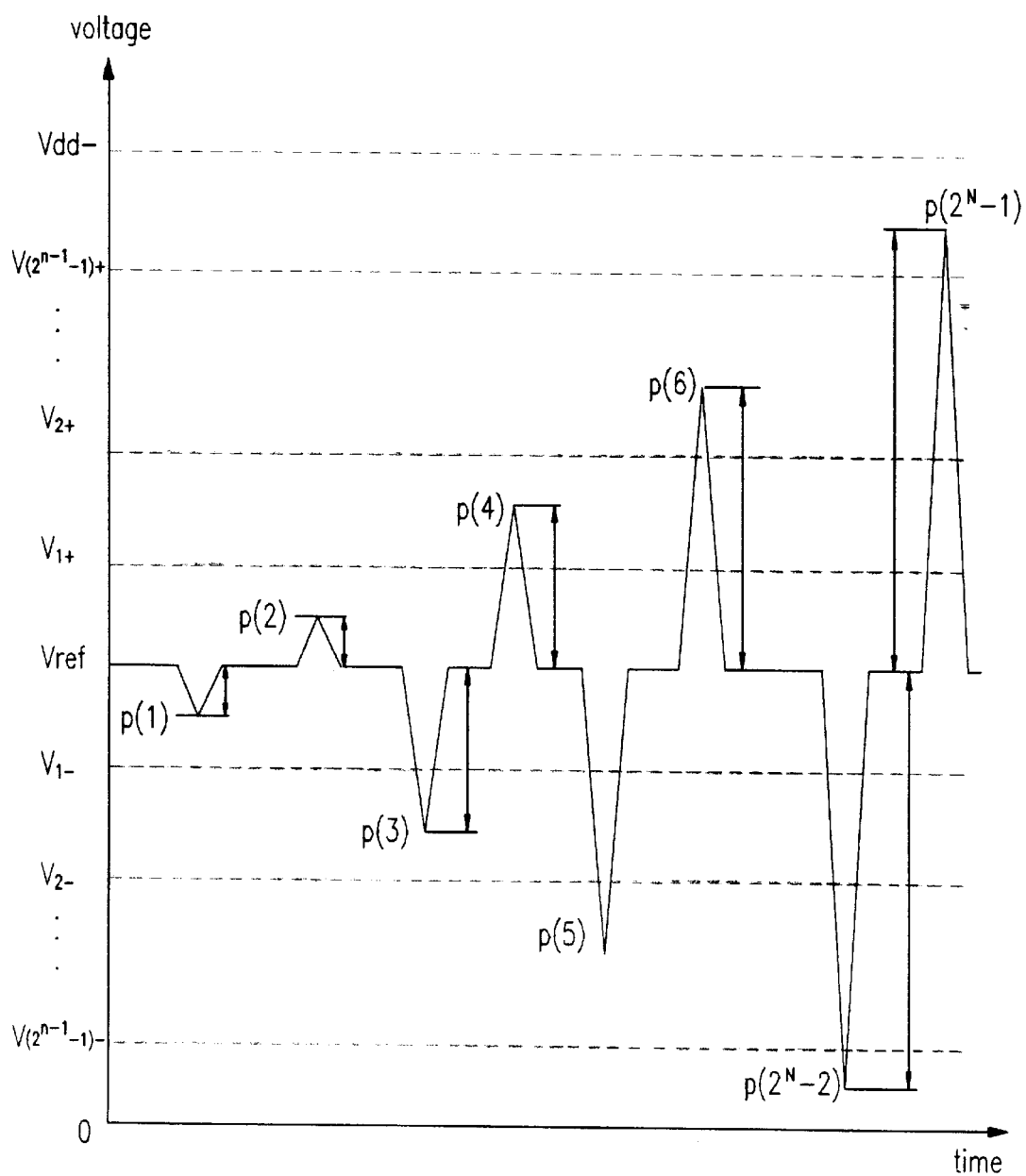
FIG. 2 illustrates states of signals transmissive through one signal transmission line shown in FIG. 1.

FIG. 2 illustrates encoded signals transmissive through the one signal transmission line shown in FIG. 1. In the driving circuit 1, N different signals are encoded into $2^N$ different signal levels, for transmission through the one signal transmission line 2. The encoded signals includes ($2^N-1$) pulse signals and a reference voltage signal Vref. When transitions of signals Si(1)~Si(N) after reception through the plurality of internal signal lines Li(1)~Li(N) are taken into consideration, a number of cases of signal transition combinations liable in the internal signal lines Li(1)~Li(N) is $2^N$. For example, the number of cases of signal transition combinations liable in three internal signal lines Li(1)~Li(3) is $2^3(8)$, as shown in TABLE 1 below of cases of combinations("1" denotes a signal transition, and "0" denotes a signal without transition).

TABLE 1

| signal | case 1 | case 2 | case 3 | case 4 | case 5 | case 6 | case 7 | case 8 |
|---|---|---|---|---|---|---|---|---|
| Si(1) | 0 | 1 | 0 | 1 | 0 | 1 | 0 | 1 |
| Si(2) | 0 | 0 | 1 | 1 | 0 | 0 | 1 | 1 |
| Si(3) | 0 | 0 | 0 | 0 | 1 | 1 | 1 | 1 |

In the driving circuit 1 of the present invention, each of the cases case 1~case 8 of signal transition combination of the signals Si(1)~Si(3) shown in TABLE 1 is encoded into different signal levels and transmitted through one signal transmission line 2, in which one of the cases case 1~case 8 of signal transition combination of the signals Si(1)~Si(3) is taken as a reference voltage Vref signal level(for example, the case when there are no transition in all of the signals). And, as shown in FIG. 2, each of the encoded signals are made to swing in a form of a triangular pulse with reference to the reference voltage Vref signal level, which allows to reduce a swing width compared to a peak-to-peak swing as in the case of an CMOS circuit. The reception circuit 3 of the present invention receives encoded signals of triangular pulse forms of different signal levels, decodes the encoded signals into a signal transition combination according to signal levels of the encoded signal, and restores the signal transition combination into original plural signals.

Figure 3:
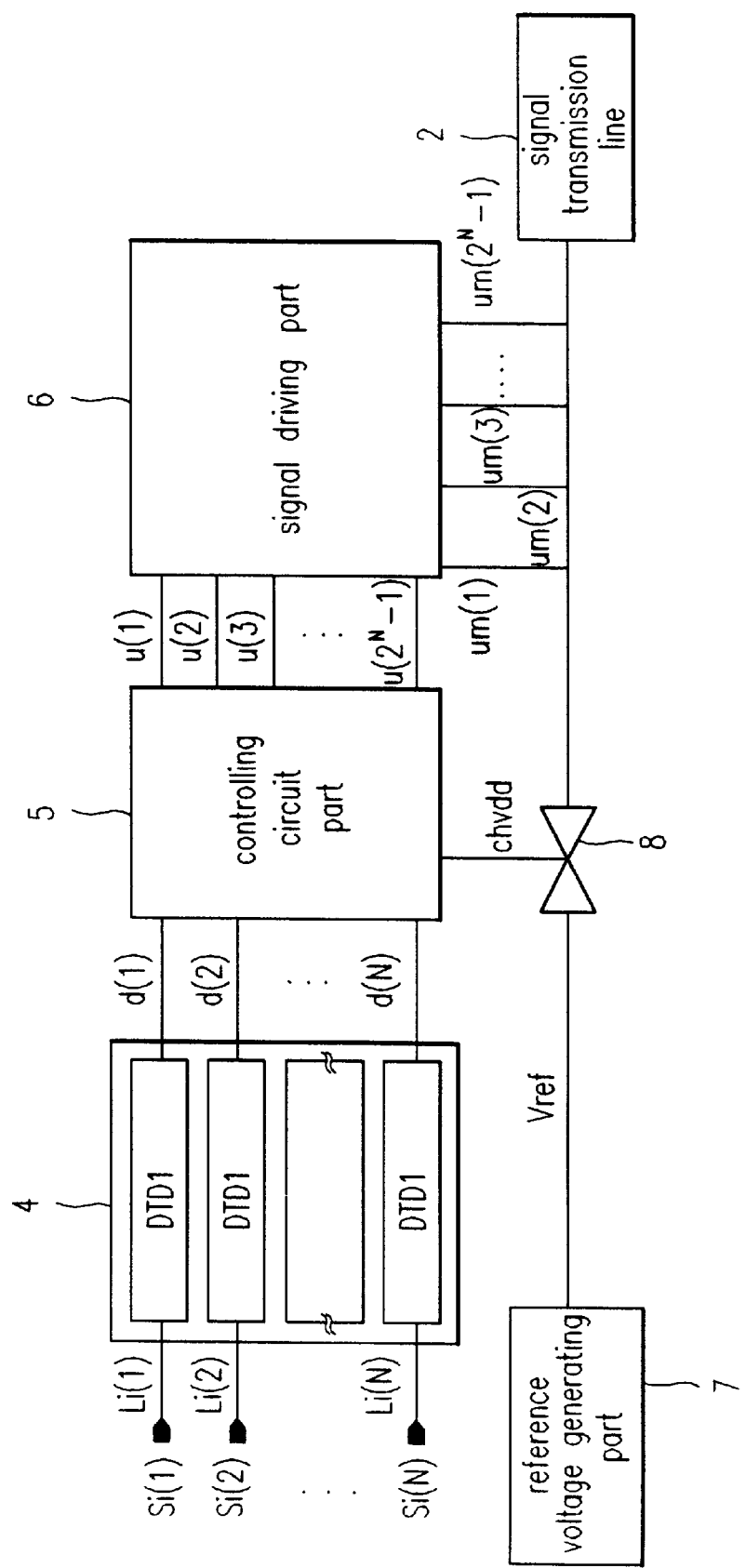
FIG. 3 illustrates a block diagram of the driving circuit shown in FIG. 1.
Figure 4:
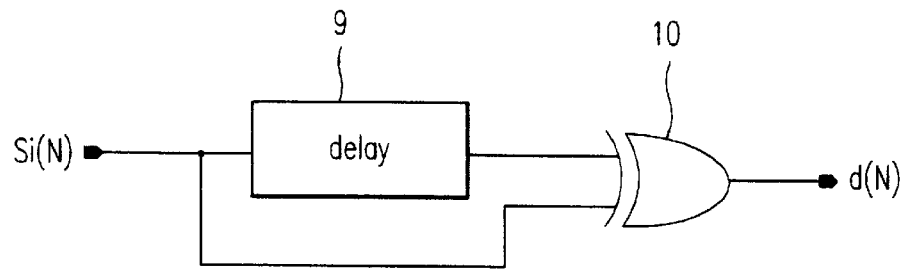
FIG. 4 illustrates a signal transition detector in the signal transition detecting part shown in FIG. 3.

FIG. 3 illustrates an entire block diagram of the driving circuit employed in the signal transmission and reception device for a new wiring system of the present invention. The driving circuit 1 includes a signal transition detecting part 4, a controlling circuit part 5, a signal driving part 6, a reference voltage generating part 7 and a switching part 8. The signal transition detecting part 4 has a number of signal transition detectors(DTD) corresponding to a number of a plurality of signals Si(1)~Si(N) received through a plurality of signal lines Li(1)~Li(N), respectively. Each of the signal transition detectors DTD1~DTDN detects transition of a signal and provides a result of the detection as a logic signal d(1)~d(N). As shown in FIG. 4, an exemplary signal transition detector DTD may have a delay 9 for delaying a signal Si(N) and an exclusive OR operator 10 for subjecting the present state of a signal and a previous state of the signal delayed in the delay 9 to exclusive OR operation to provide a result of the operation as a detecting signal d(N). Each of the signal transition detectors DTD1~DTDN provides, either a first logic level(for example, a logic level of "1") when there is a signal level transition, or a second logic level(for example, a logic level of "0"), which has a reverse logic of the first logic level, when there is no signal transition, for detecting the transition(in this instance, the first logic level may be logic "0" level, while the second logic level may be logic "1" level). The controlling circuit part 5 receives the detecting signals d(1)~d(N) from the signal transition detectors DTD1~DTDN in the signal transition detecting part 4 and generates $2^N$ encoding control signals corresponding to a number of possible combinations of the detecting signals d(1)~d(N). The $2^N$ encoding control signals have one switching control signal chvdd and $^N2-1$ driving control signals u(1)~u($2^N-1$). The switching control signal chvdd, being a signal provided from the reference voltage generating part 7 for switching control of the reference voltage Vref, which is a reference level of the signal transmission line 2, is applied to the switching means 8 for either connecting or disconnecting the reference voltage Vref to/from the signal transmission line 2. The switching control signal chvdd controls the switching means 8 such that the reference voltage Vref is applied to the signal transmission line 2 in the case when there is no transition in any of the signals Si(1)~Si(N) as results of the signal detection in the signal transition detecting part 4, i.e., when all the detecting signals d(1)~d(N) of the signal transition detecting part have a logic level of "0". Opposite to this, in the case when there is a transition even in any ot the signals Si(1)~Si(N) as results of signal detection in the signal transition detecting part 4, i.e.. any of the detecting signals d(1)~d(N) from the signal transition detector is "1", the switching control signal chvdd controls the switching means 8 such that the reference voltage Vref is not to be applied to the signal transmission line 2. The driving control signals u(1)~u($2^N-1$) controls the signal driving part 6 in the next stage, for encoding the $2^N-1$ pulses shown in FIG. 2. The signal driving part 6 charges a current to or discharges a current from the signal transmission line 2 in response to the driving control signals u(1)~u($2^N-1$) for generating relevant signal levels of the plurality of signal levels shown in FIG. 2. That is, in the present invention, for driving the signal transmission line 2, a method is used in which the signal transmission line 2 is precharged to the reference voltage Vref for being discharged to ground or charged to a driving power, for generating the transmission pulses as shown in FIG. 2.

Figure 5:
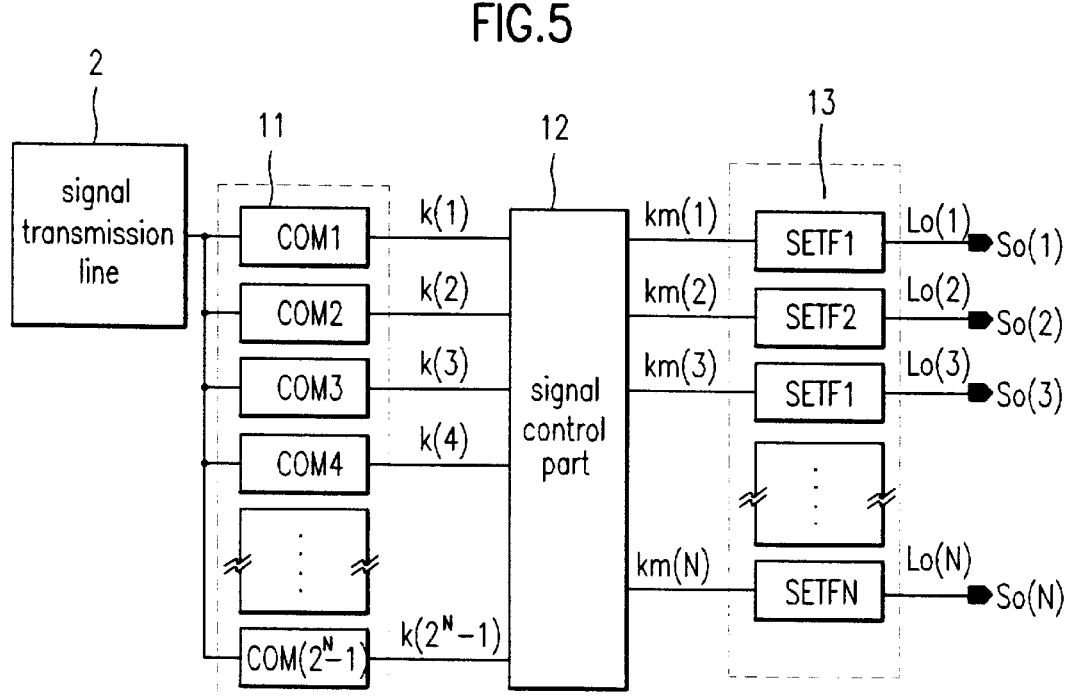
FIG. 5 illustrates a block diagram of the reception circuit shown in FIG. 1.
Figure 9:
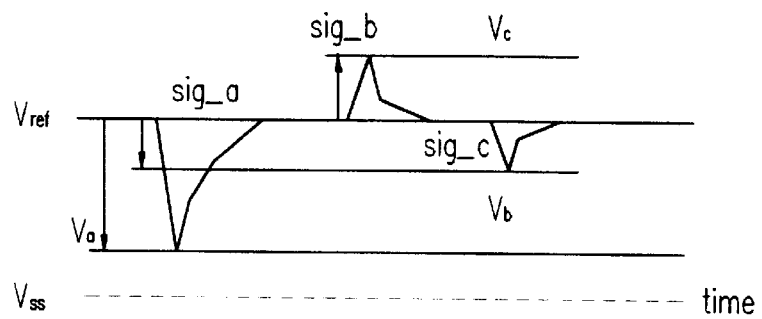
FIG. 9 illustrates transmission signal pulses generated on the signal transmission line by the driving circuit shown in FIG. 7.

FIG. 5 illustrates an entire block diagram of a reception circuit employed in the signal transmission and reception device for a new wiring system of the present invention. The reception circuit includes a signal comparing part 11, a signal controlling part 12 and a signal forwarding circuit part 13. The signal comparing part 11 has a plurality of comparators COM1~COM($2^N$-1) for receiving a signal with signal levels as shown in FIG. 9 through the signal transmission line 2 and determining the levels of the signal, wherein parameters which can identify an adjacent pulse as shown in FIG. 2 are set. When $2^N$ different signal levels as shown in FIG. 2 are received through the signal transmission line 2, the signal comparing part 11 compares levels of the received signal by means of the $2^N$-1 comparators and provides comparison result signals k(1)~k($2^N$-1). The signal controlling part 12 decodes the comparison result signals k(1)~k($2^N$-1) from the signal comparing part 11 and provides signals of pulses corresponding to the detecting signals detected in the signal transition detecting part 4 of the driving circuit 1 as decoding signals km(1)~km(N). The detecting signals from the signal transition detectors may be pulses ot logic "1" or "0", and the decoding signals may be pulses with a logic level identical or reverse to the detecting signal. The signal forwarding circuit part 13, for restoring the plurality of signals received at the driving circuit 1 from the decoding signals km(1)~km(N), includes a plurality of signal set and forwarders SETF1~SETFN as many as the number of the decoding signals km(1)~km(N).

Figure 6:
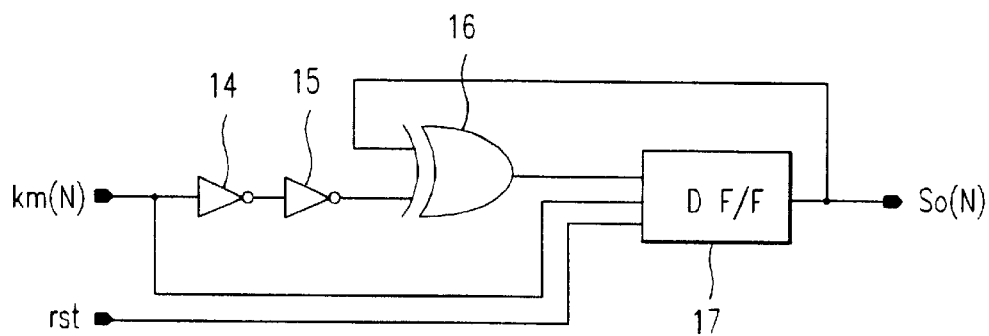
FIG. 6 illustrates detail of a signal set and forwarder in the signal forwarding part shown in FIG. 5.

FIG. 6 illustrates an exemplary signal set and forwarder in the signal forwarding circuit 13. The signal set and forwarder is formed with an asynchronous edge-triggered T flip-flop including an invertor for inverting a level of the decoding signal km(N) and an invertor 15 for re-inverting the inverted signal from the invertor 14 into an original signal level. This invertors 14 and 15 are connected in series for delaying the decoding signals km(N). The signal set and forwarder includes an exclusive OR operator 16 for receiving and subjecting the decoding signal km(N) delayed by the invertors 14 and 15 and a signal fed back from a D type flip-flop in a following stage to exclusive OR operation, and the D type flip-flop 17 operative on the signal from the exclusive OR operator 16 as a data signal and the decoding signal km(N) from the signal controlling part 12 as a clock signal. The signal is delayed by the two invertors, for latching the signal in the D type flip-flop 17 when there is a signal transition to "0".

A signal transmission and reception device for transmitting two signals received through two internal signal lines through one signal transmission line will be explained with reference to specific circuits as an example of the aforementioned signal transmission and reception device for a new wiring system of the present invention.

Figure 7:
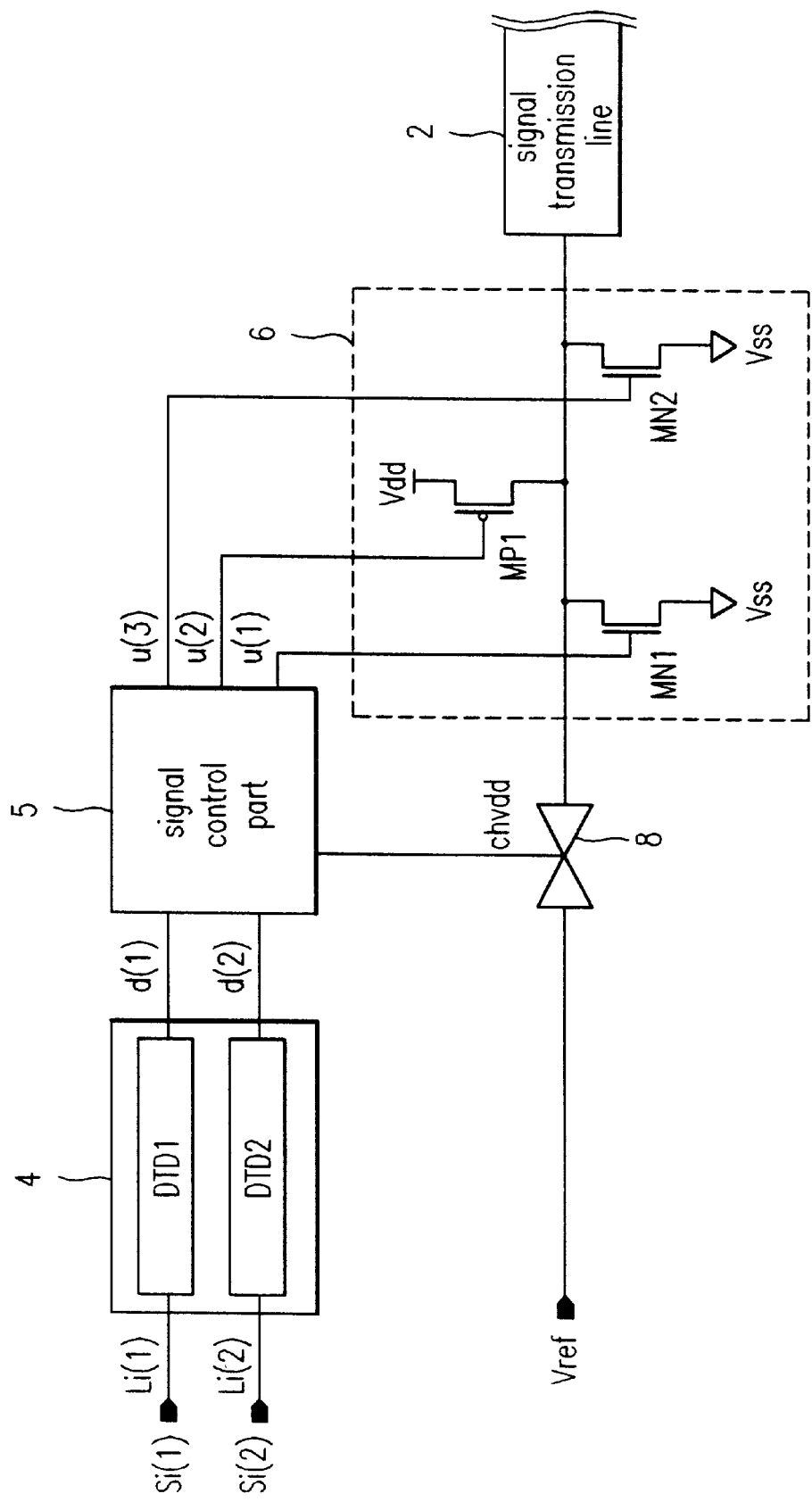
FIG. 7 illustrates a driving circuit for transmission of two signals through one signal transmission line in accordance with a first preferred embodiment of the present invention.

FIG. 7 illustrates one embodiment of a driving circuit for transmitting two signals received through two internal signal lines in a function block of an integrated circuit through one signal transmission line.

Figure 8:
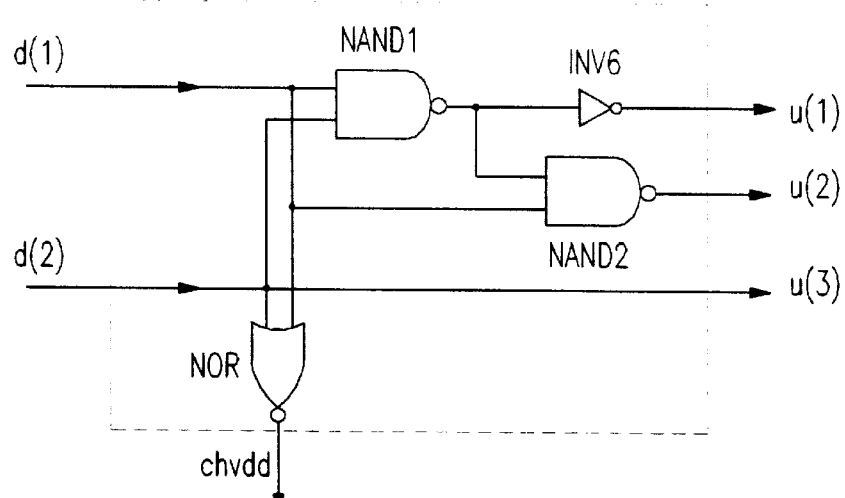
FIG. 8 illustrates an exemplary control circuit part shown in FIG. 7.

Referring to FIG. 7, upon reception of two signals of first, and second signals Si(1) and Si(2) through internal signal line Li(1) and Li(2) in a function block respectively, the signal transition detectors DTD1 and DTD2 detect transitions of the signals Si(1) and Si(2) and provide first, and second detecting signals d(1) and d(2) as logic signals respectively; a logic level of "1" when there is a signal transition and a logic level of "0" when there is no signal transition. A controlling circuit part 5 receives the first, and second detecting signals d(1) and d(2) from the signal transition detecting part 4 and provides a switching signal chvdd and first~third driving control signals u(1), u(2) and u(3). One embodiment of such a controlling circuit part is illustrated in FIG. 8, wherein an NAND operator NAND1 subjects the first and second detecting signals d(1) and d(2) to NAND operation, an NAND operator NAND2 subjects the first detecting signal d(1) and a logic level from the NAND operator NAND1 to NAND operation, to provide a second driving control signal u(2), the second detecting signal d(2) is directly provided as a third driving control signal u(3), and the invertor INV6 inverts an output from the NAND operator NAND1, to provide a first driving control signal u(1). And, an NOR operator subjects the first and second detecting signals d(1) and d(2) to NOR operation, and provides to the switching means 8 as a switching control signal chvdd. The first to third driving control signals u(1), u(2) and u(3) generated by the controlling circuit part 5 may be expressed in Boolean equations as below.

$$u(1) = d(1) \cdot d(2)$$

$$u(2) = \left[\overline{\overline{[d(1) \cdot d(2)]} \cdot d(1)]}\right] = \overline{d(1) \cdot d(2)} + \overline{d(1)}$$

$$u(3) = d(2)$$

The logic of the controlling circuit part 5 expressed in the aforementioned equations can be shown in TABLE 2. below.

TABLE 2

| input | | ouput | | | |
|---|---|---|---|---|---|
| d(1) | d(2) | chvdd | u(1) | u(2) | u(3) |
| 0 | 0 | 1 | 0 | 1 | 0 |
| 0 | 1 | 0 | 0 | 1 | 1 |
| 1 | 0 | 0 | 0 | 0 | 0 |
| 1 | 1 | 0 | 1 | 1 | 1 |

As can be known from TABLE 2, the switching control signal chvdd is at a logic "1" level only when both the first, and second detecting signals d(1) and d(2) are at logic levels "0", i.e., both the first, and second signals Si(1) and Si(2) are not involved in signal transition. In this instance, the switching means 8 is switched to provide the reference voltage Vref to the signal transmission line 2. And, the first driving control signal u(1) is at a logic "1" level only when both the first, and second detecting signals d(1) and d(2) are at logic levels "1", i.e., both the first, and second signals Si(1) and Si(2) are involved in signal transitions. The second driving control signal u(2) is at a logic "1" level when the first detecting signal d(1) only is at a logic "1" level of the first, and second detecting signals d(1) and d(2), i.e., except the case when the first signal only is involved in a signal transition. The third driving control signal u(3) is at a logic level identical to the second detecting signal d(2). The signal driving part 6 includes first to third driving transistors MN1, MP1 and MN2. The first driving transistor MN1 is an N type MOS transistor having a gate electrically connected to an output terminal for the first driving control signal u(1) on the controlling circuit part 5, a source grounded, and a drain electrically connected to the signal transmission line 2. The first driving transistor MN1 becomes conductive upon reception of the first driving control signal u(1) of a logic "1" level from the controlling circuit part 5, to cause a current discharge from the signal transmission line 2 to the ground. The second driving transistor MP1 is a P type MOS transistor having a gate electrically connected to an output terminal for the second driving control signal on the controlling circuit part 5, a drain electrically connected to the signal transmission line 2, and a source connected to a power source Vdd. The second driving transistor MP1 becomes conductive upon reception of the second driving control signal u(2) of a logic "0" level from the controlling circuit part 5, to cause a current charge from the power source Vdd to the signal transmission line 2. The third driving transistor MN2 is an N type MOS transistor having a gate electrically connected to an output terminal for the third driving control signal u(3) on the controlling circuit part 5, a drain electrically connected to the signal transmission line 2, and a source grounded. The third driving transistor MN2 becomes conductive upon reception of the third driving control signal u(3) of a logic "1" level from the controlling circuit part 5, to cause a current discharge from the signal transmission line 2 to the ground. TABLE 3 below shows signal assignment according to the aforementioned operation of the signal driving part 6.

TABLE 3

| input signal | | detecting signal | | controlling circuit output | | | | driving circuit output |
|---|---|---|---|---|---|---|---|---|
| Si(1) | Si(2) | d(1) | d(2) | chvdd | u(1) | u(2) | u(3) | |
| no | no | 0 | 0 | 1 | 0 | 1 | 0 | sig = Vref |
| no | yes | 0 | 1 | 0 | 0 | 1 | 1 | sig(=sig_c) < Vref |
| yes | no | 1 | 0 | 0 | 0 | 0 | 0 | sig(=sig_b) > Vref |
| yes | yes | 1 | 1 | 0 | 1 | 1 | 1 | sig(=sig_a) << Vref |

*"no" denotes no signal transition, and "yes" denotes a signal transition.

As can be known from TABLE 3, when both the first and second signals Si(1) and Si(2) are not involved in transition, at which the switching means is conductive and the first to third driving, transistors MN1, MP1 and MN2 are shut down, the reference voltage Vref is applied to the signal transmission line 2. When only the second signal Si(2) is involved in a signal transition, at which the switching means 8 is shut down and the third driving transistor MN2 only is conductive, triangular pulses slightly lower than the reference voltage Vref the same as a signal waveform sig_c shown in FIG. 9 is applied to the signal transmission line 2. When only the first signal Si(1) is involved in a signal transition, at which the switching means 8 is shut down and the second driving transistor MP1 only is conductive, triangular pulses higher than the reference voltage Vref the same as a signal waveform sig_b shown in FIG. 9 is applied to the signal transmission line 2. When both the first, and second signals Si(1) and Si(2) are involved in signal transitions, at which the switching means 8 is shut down and only the first, and third driving transistors MN1 and MN2 only are conductive, triangular pulses very lower than the reference voltage Vref the same as a signal waveform sig_a shown in FIG. 9 is applied to the signal transmission line 2.

As it is apparent from the driving circuit which can transmit two signals provided through two internal signal transmission lines in a function block of an integrated circuit through one signal transmission line explained with reference to FIGS. 7–9, if a plurality of signals received through a plurality of signal lines are encoded for all the possible signal transition combinations, the plurality of signals can be transmitted through one signal transmission line in different signal levels.

Figure 10:
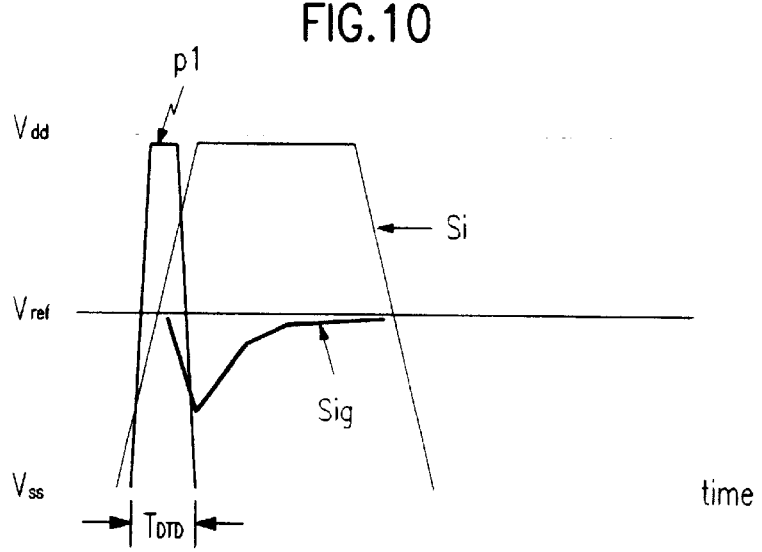
FIG. 10 illustrates a generation principle of the transmission signal pulses shown in FIG. 9.

Referring to FIG. 10, as the signal transition detecting part detects a transition of a signal(Si indicated in a dotted line) as a momentary pulse P1 and transmits a signal sig using the pulse, in the present invention, the signal comes back in a normal state. Therefore, a width of swing of the signal can be reduced below a half of the background art driving circuit, with a reduction of time period taken for rising and dropping of the signal, allowing application to a fast speed circuit. And, in the present invention, the transmission of a signal Si in a form of a pulse with a width smaller than 0.5 times of a frequency of the signal based on transition states of the signal detected facilitates a significant power consumption reduction compared to a signal transmission method in which the signal level is changed between a driving power source Vdd and ground.

In the present invention, signals are transmitted by precharging a signal transmission line 2 at a reference voltage Vref(approx. ½ of the system power supply voltage Vdd), generating pulses through the signal transition detecting part when the signals Si(1)~Si(N) are involved in signal transitions, and providing signals with narrow widths to the signal transmission line 2. This can be made possible by connecting and disconnecting the precharging path and the discharging path. However, the signal may not be detected by a differential amplifier in the reception circuit at a long signal transmission line as an energy is only supplied momentarily in the present invention, causing much signal attenuation in the signal transmission line. In this instance, a duration of the pulse generated in the signal transition detecting part is adjusted depending on the signal transmission line.

In the driving circuit 1 of the present invention, the reference voltage Vref is connected to or disconnected from the signal transmission line 2 using a transmission gate as the switching means 8. When the signals Si(1)~Si(N) are involved in no signal transition, the signal detecting signals d(1)~d(N) from the signal transition detecting part 4 are at, for an example, logic levels "0" and the switching control signal chvdd from the controlling circuit part 5 is at, for an example, a logic "1" level, to fix the signal transmission line 2 at the reference voltage Vref by means of the switching means 8. Opposite to this, when the signals Si(1)~Si(N) are involved in signal transition, the signal detecting signals d(1)~d(N) from the signal transition detecting part 4 are at, for an example, logic levels "1" as the pulse P1 shown in FIG. 10, the switching control signal chvdd from the controlling circuit part 5 is at, for an example, a logic "0" level, and the signal is provided from the signal driving part 6 for a time period as much as a transition time period $T_{DTD}$ of the signals Si(1)~Si(N), allowing the signal transmission line 2 charged or discharged momentarily in response to a signal providing pulse from the signal driving part 6 (FIG. 10 illustrates a signal pulse sig of a transmitted data received to the signal transmission line in response to discharge of the signal transmission line). Shape and peak voltage(Va, Vb and Vc in FIG. 9) of the signal pulse sig applied to the signal transmission line 2 is dependent on a duration of application, i.e., $T_{DTD}$ and a size of the driving transistors in the signal driving part 6. After lapse of time as much as $T_{DTD}$, the reference voltage Vref is supplied through the switching means 8 until a level of the signal transmission line 2 stabilized. A tailing time period of the signal pulse sig shown in FIG. 10 is dependent on a size of the transmission gate as the switching means and a current supply capability of the reference voltage generating part which generates the reference voltage Vref.

Figure 11:
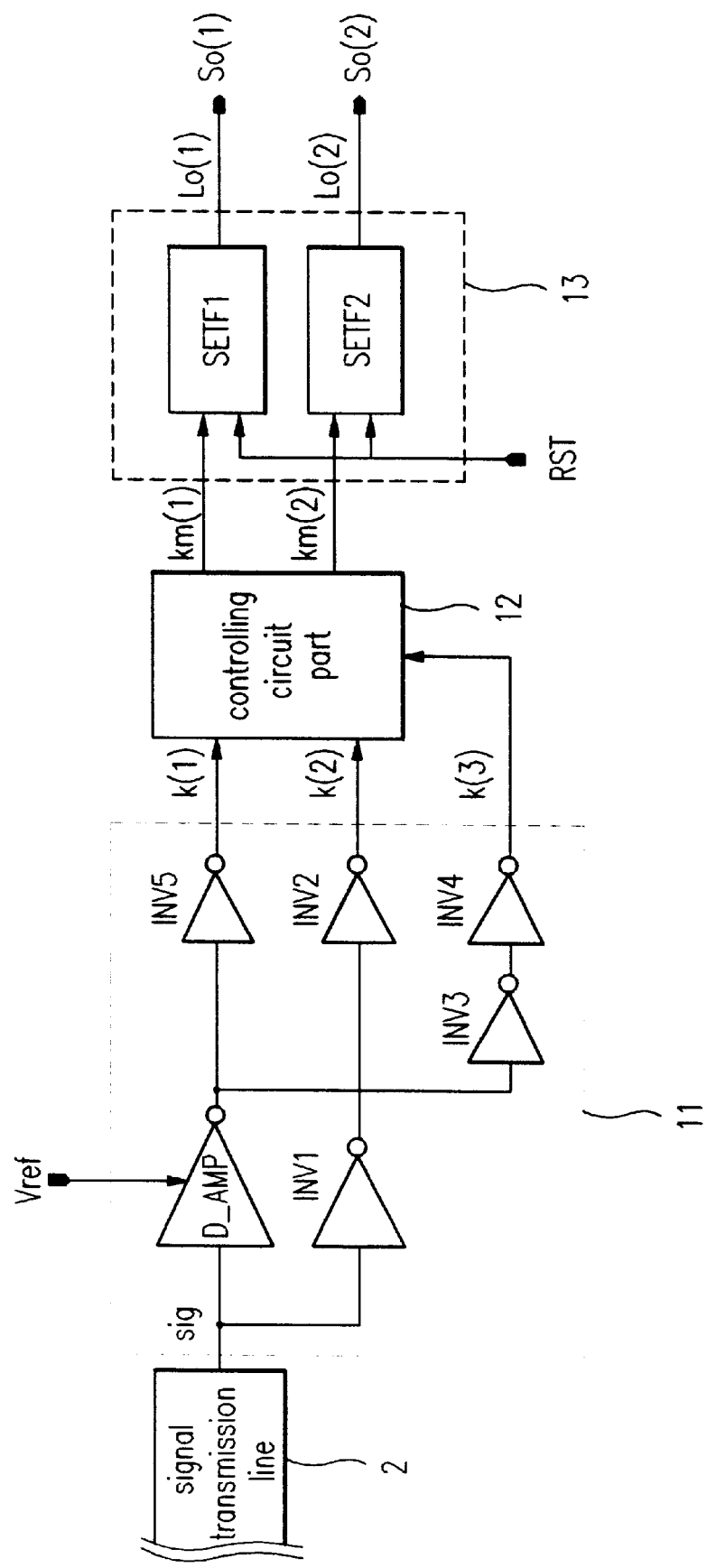
FIG. 11 illustrates one embodiment of a reception circuit for receiving two signals through one signal transmission line and restoring the two signals in accordance with the present invention.

FIG. 11 illustrates one embodiment of the reception circuit corresponding to the driving circuit shown in FIG. 7, for receiving two signals. A signal sig is received at a signal comparing part 11 through a signal transmission line 2. The signal comparing part 11 detects a pulse form of the signal by using three comparing paths for the signal sig. A first comparing path has two invertors INV1 and INV2, a second comparing path has a differential amplifier D_AMP and two invertors INV3 and INV4, and a third comparing path has a differential amplifier D_AMP and an invertor INV5. The differential amplifiers are applied of the reference voltage as on of its input. The invertor INV1 in the first comparing path has a logic threshold voltage set at a value higher than Va shown in FIG. 9 but lower than Vb. Upon reception of a signal very lower than the reference voltage Vref as the signal sig_a shown in FIG. 9 through the signal transmission line 2, in the first comparing path, the invertor INV1 provides a logic "1" to provide an inverted logic "0" as an output signal k(2) to a signal controlling part 12 through the invertor INV2. Upon reception of the signals sig_b and sig_c, as the invertor INV1 in the first comparing path provides a logic "0", a logic "1" is provided to the signal controlling part 12 as an output signal k(2). The invertor INV3 in the second comparing path has a logic threshold voltage set at a low value. In the second comparing part, upon reception of signals sig_a and sig_c as shown in FIG. 9 through the signal transmission line 2, the invertor INV3 provide a logic "1" as an output of the differential amplifier D_AMP drops to a low level, to provide an inverted logic "0" as an output signal k(3) to the signal controlling part 12 through the invertor INV4. On the other hand, upon reception of the signal sig_b, the invertor INV3 in the second comparing path provide a logic "0" as an output of the differential amplifier D_AMP rises up to a high level, to provide an inverted logic "1" as an output signal k(3) to the signal controlling part 12 through the invertor INV4. The invertor INV5 in the third comparing path has a logic threshold voltage set at a high value. In the third comparing part, upon reception of signals sig_a and sig_c as shown in FIG. 9 through the signal transmission line 2, the invertor INV5 provide a logic "1" to the signal controlling part 12 as an output k(3) as an output of the differential amplifier D_AMP drops to a low level, and, on the other hand, upon reception of the signal sig_b, the invertor INV5 provide a logic "0" as an output k(3) to the signal controlling part 12, as an output of the differential amplifier D_AMP rises up to a high level.

Thus, the signal comparing, part can determine a state of the signal through the three comparing paths with easy, which can be summarized as TABLE 4, below.

Figure 12:
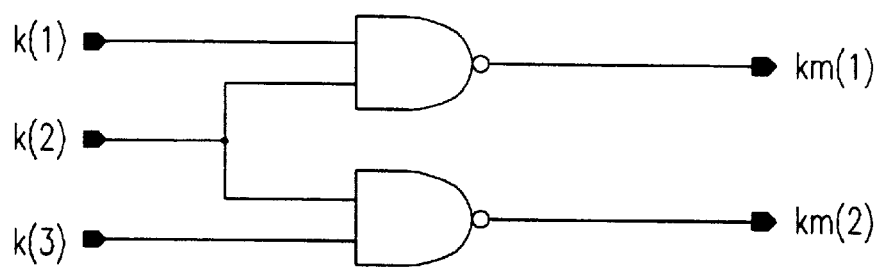
FIG. 12 illustrates detail of an exemplary signal control part shown in FIG. 11.

The signal controlling part 12 receives the signals k(1), k(2) and k(3) from the signal comparing part 11 and subjects to logical operation, to decode signal transitions(logic states identical to the signals provided from the signal transition detectors DTDs) of the signals Si(1) and Si(2) received at the driving circuit 1. That is, with reference to TABLE 4, the signal sig_a in FIG. 9 is a signal generated when both of the signals Si(1) and Si(2) are involved in signal transitions, and causes both of signals from the signal transition detectors DTD1 and DTD2 to be logic "1", the signal sig_b in FIG. 9 is a signal generated when only the signal Si(1) is involved in signal transition, and causes only a signal from the signal transition detector DTD1 to be logic and the signal sig_c in FIG. 9 is a signal generated when only the signal Si(2) is involved in signal transition, and causes only a signal from the signal transition detector DTD2 to be logic "1". These output logic states km(1) and km(2) of the signal controlling part 12 can be shown as shown in TABLE 4. An exemplary signal controlling part 12 with such a logical output may be formed with two NAND operator as shown in FIG. 12.

A signal forwarding circuit part 13 may includes two signal set and forwarders as shown in FIG. 6 each for receiving a signal km(1) and km(2) from the signal controlling part 12 and restoring the signal Si(1) and Si(2) received at the driving circuit 1, wherein the signal km(N) is adapted to be provided as a clock signal to the D-flipflop 17, delayed by the invertors 14 and 15, subjected to exclusive OR operation with a signal from the D flipflop 17, and provided to the D flipflop 17 as a data signal for the D flipflop 17, and the D flipflop 17 is adapted to latch a received data at a falling edge of the signal km(N), received as a clock signal. For example, when the D flipflop 17 receives a pulse of logic "1" level as a signal km at a state in which the D flipflop provides a signal of logic "0", the invertors 14 and 15 delay the logic "1" level, to drop the signal km down to logic "0" level while the data received at the D flipflop is logic "1", causing the D flipflop 17 to latch logic "1". Thereafter, if a pulse of a logic "1" level of the signal km is received, dropping the signal km down to logic "0" level in a state in which a data provided to the D flipflop at a logic "0", the D flipflop latches the logic; "0". Therefore, each of the signal set and forwarders in the signal forwarding part 13 toggles a state of output in response to pulse of the signal km(1) and km(2) from the signal controlling part 12. As the pulses of the signals km(1) and km(2) from the signal controlling part 12 is identical to the detected signal waveforms from the signal transition detecting part 4, the signal forwarding part 13 forwards signals identical to the signals Si(1) and Si(2) received at the driving circuit 1.

Figure 13:
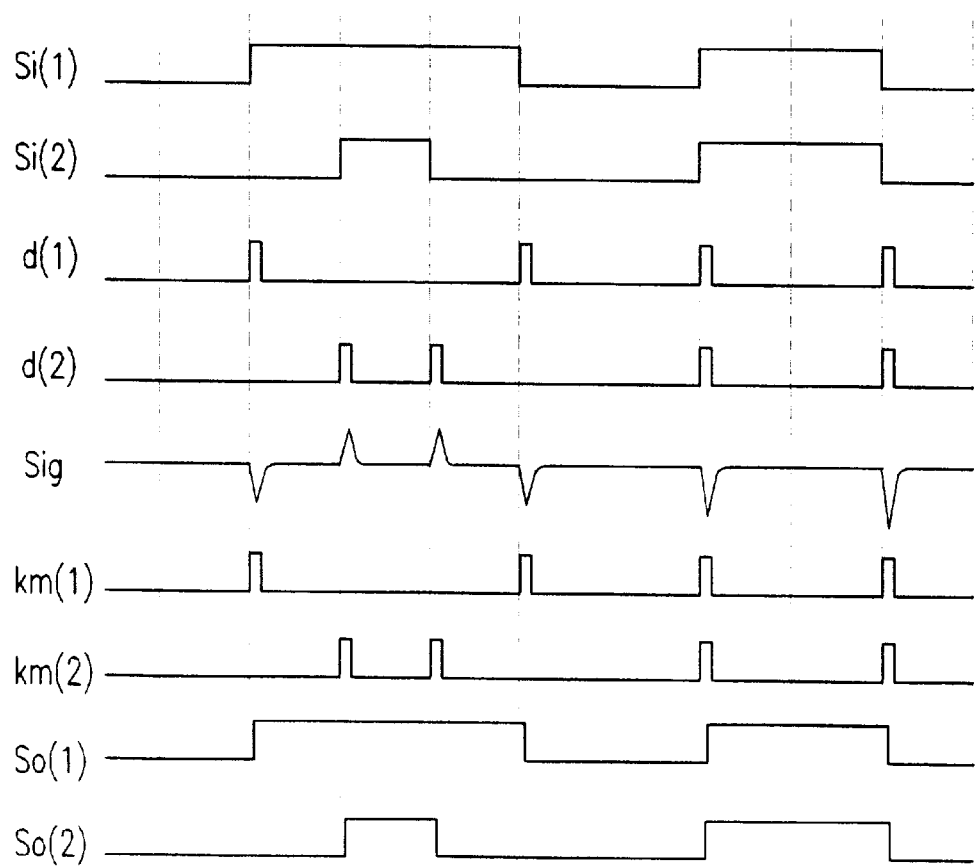
FIG. 13 illustrates waveforms showing states of outputs of respective parts in FIG. 7 and 11.

FIG. 13 illustrates timings of signals of different parts in the driving circuit and reception circuit for transmitting and receiving two signal via a signal transmission line explained above. The Si(1) and Si(2) are signals received at the driving circuit 1 and d(1) and d(2) are signals from the signal transition detecting part 4. Sig is a signal encoded in the driving circuit and transmitted through the transmission line, and km(1) and km(2) are signals decoded in the signal

TABLE 4

| signal | k(1) | k(2) | k(3) | km(1) | km(2) | So(1) | So(2) |
|---|---|---|---|---|---|---|---|
| sig = Vref | 1 | 1 | 1 | 0 | 0 | no | no |
| sig(= sig_c) < Vref | 1 | 1 | 0 | 0 | 1 | no | yes |
| sig(= sig_b) > Vref | 0 | 1 | 1 | 1 | 0 | yes | no |
| sig(= sig_a) << Vref | 1 | 0 | 0 | 1 | 1 | yes | yes |

*"no" denotes no signal transition, and "yes" denotes a signal transition.

controlling part 12 in the reception circuit having waveforms identical to the signals provided from the signal transition detecting part 4 in the driving circuit. So(1) and So(2) are signals from the signal forwarding circuit part 13 having restored into waveforms identical to the signals Si(1) and Si(2) received at the driving circuit.

Figure 14:
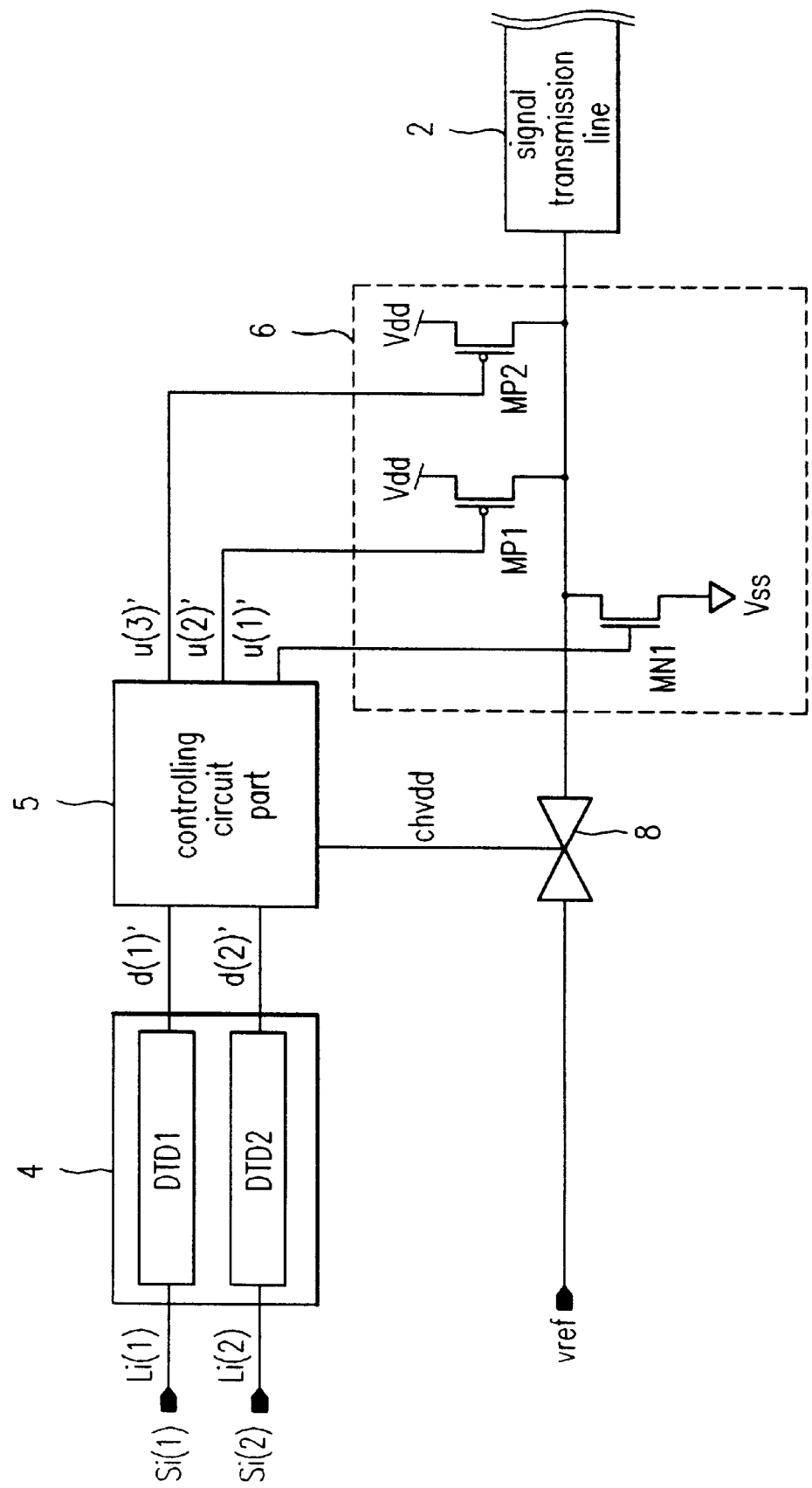
FIG. 14 illustrates an exemplary modified version of the signal driving part shown in FIG. 7.
Figure 15:
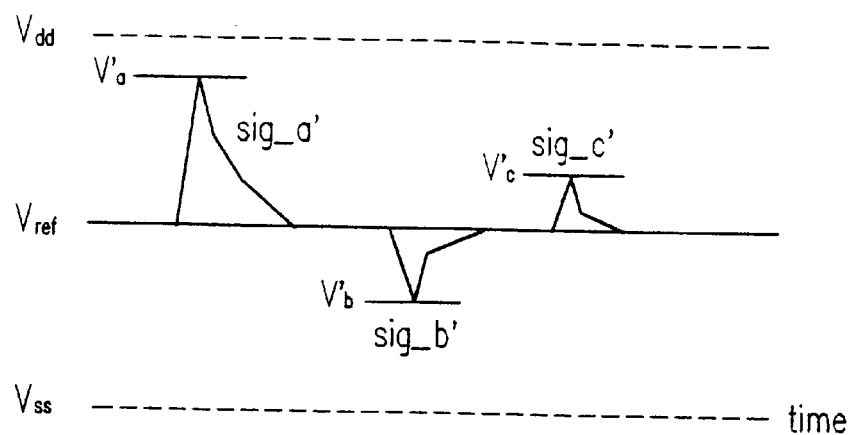
FIG. 15 illustrates transmission signal pulses generated on a signal transmission line by the signal driving part in FIG. 14.
Figure 16:
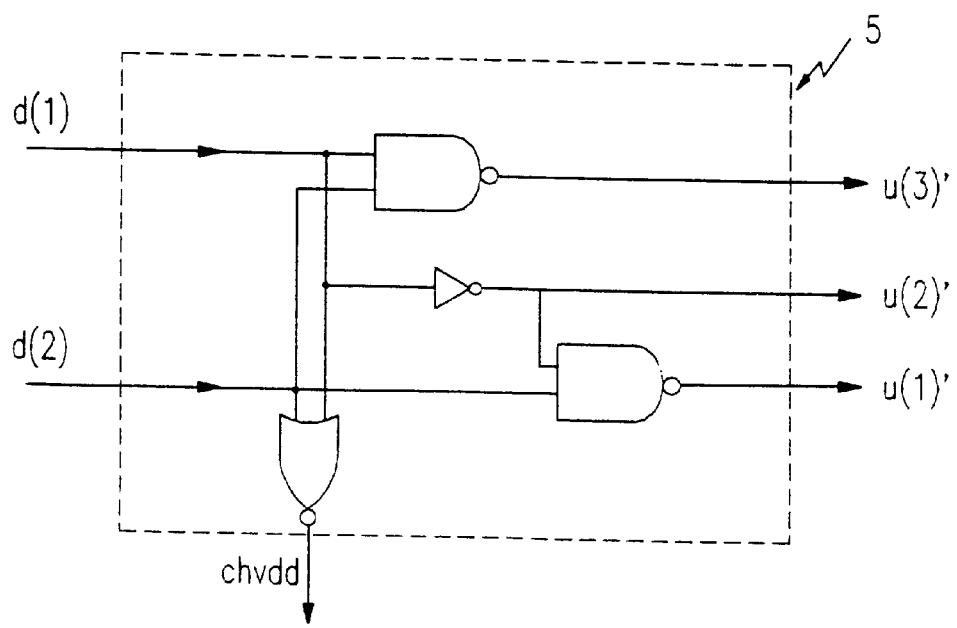
FIG. 16 illustrates an exemplary modified version of the control circuit part shown in FIG. 7.

The signal driving part 6 in the driving circuit 1 explained in association with FIG. 7 may have a system as shown in FIG. 14. In this instance, signal as shown in FIG. 15 is provided on the signal transmission line when both of the signals Si(1) and Si(2) are involved in signal transition. sig_b' is provided on the signal transmission line when only the signal Si(1) is involved in signal transition, and sig_c' is provided on the signal transmission line when only the signal Si(2) is involved in signal transition. A system of the controlling circuit part for providing such signals is illustrated in FIG. 16. Signal assignment of this case is illustrated in TABLE 5, below.

TABLE 5

| input signal | | detecting signal | | controlling circuit output | | | | driving circuit output |
|---|---|---|---|---|---|---|---|---|
| Si(1) | Si(2) | d(1) | d(2) | chvdd | u(1)' | u(2)' | u(3)' | |
| no | no | 0 | 0 | 1 | 0 | 1 | 1 | sig = Vref |
| no | yes | 0 | 1 | 0 | 0 | 0 | 1 | sig(=sig_c') > Vref |
| yes | no | 1 | 0 | 0 | 1 | 1 | 1 | sig(=sig_b') < Vref |
| yes | yes | 1 | 1 | 0 | 0 | 0 | 0 | sig(=sig_a') << Vref |

*"no" denotes no signal transition, and "yes" denotes a signal transition.

Figure 17:
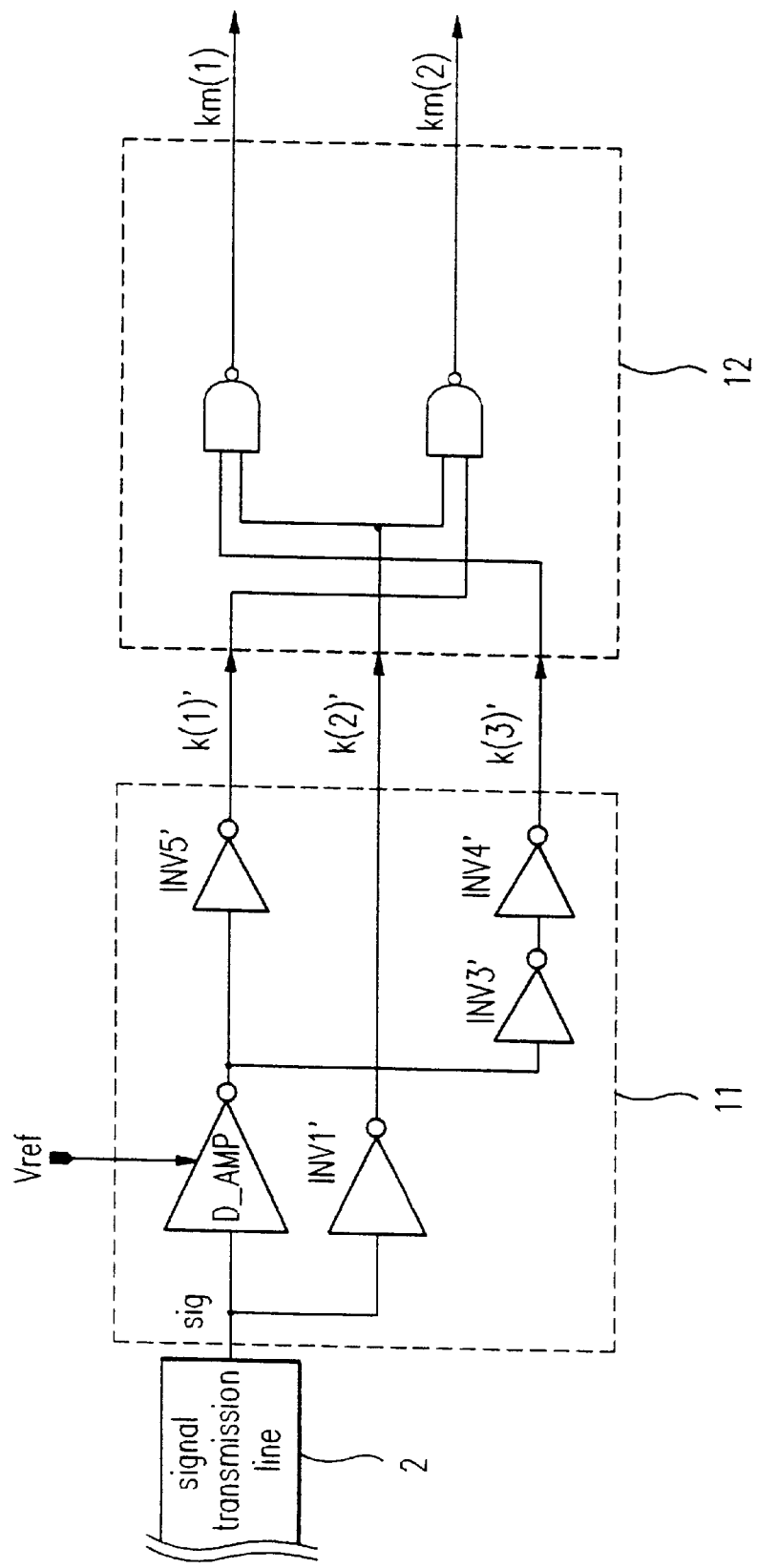
FIG. 17 illustrates exemplary modified versions of the signal comparing part and the signal controlling part shown in FIG. 11; and, FIG. 18 illustrates another exemplary modified version of the controlling circuit part shown in FIG. 7.

The signal comparing part 11 in the reception circuit 3 may have a system as shown in FIG. 17 for processing the signals shown in FIG. 15, which is different from the signal comparing part shown in FIG. 11 in that the first comparing path is only formed with an invertor INV1' and the invertor INV1' has a logic threshold voltage set very high higher than Vc' and lower than Va' shown in FIG. 15. Signal assignment of this case is illustrated in TABLE 6, below.

TABLE 6

| signal | k(1)' | k(2)' | k(3)' | km(1) | km(2) | So(1) | So(2) |
|---|---|---|---|---|---|---|---|
| sig = Vref | 1 | 1 | 1 | 0 | 0 | no | no |
| sig(= sig_c') > Vref | 0 | 1 | 1 | 0 | 1 | no | yes |
| sig(= sig_b') < Vref | 1 | 1 | 0 | 1 | 0 | yes | no |
| sig(= sig_a') >> Vref | 0 | 0 | 1 | 1 | 1 | yes | yes |

*"no" denotes no signal transition, and "yes" denotes a signal transition.

Figure 18:
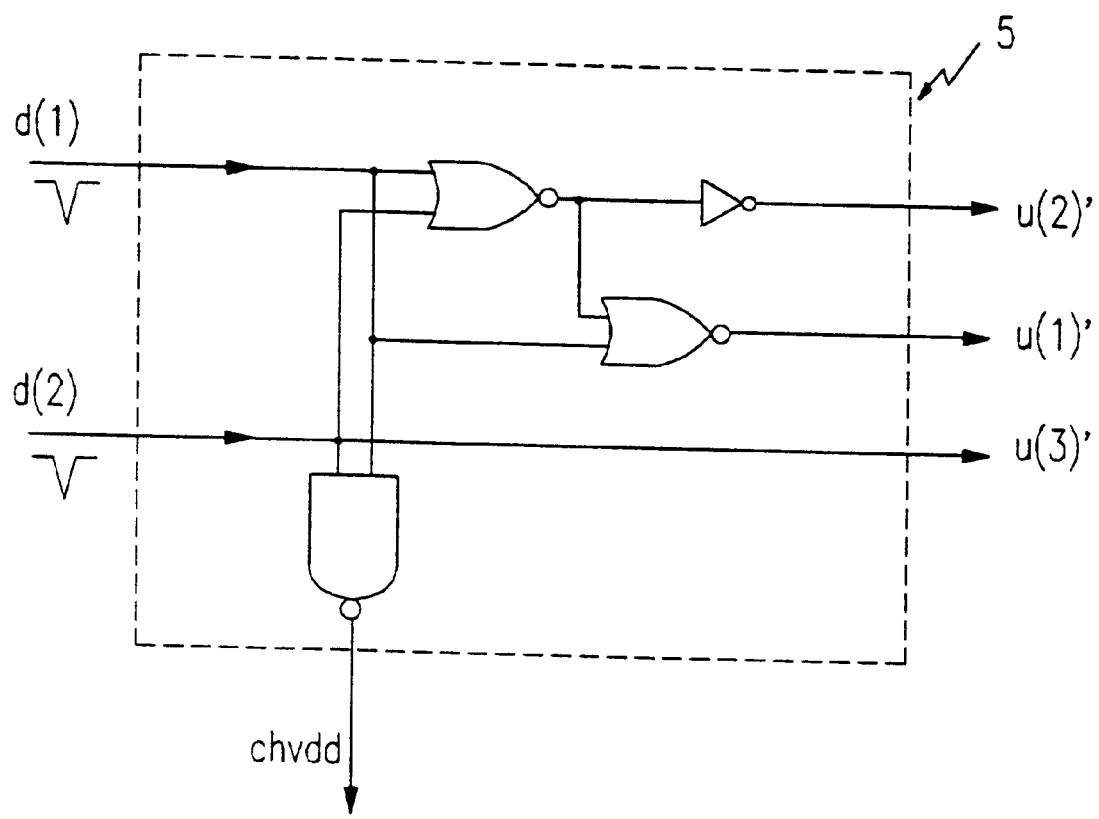

Though the present invention has been explained for the case when each of the signal transition detectors DTDs in the signal transition detecting part generates a pulse of logic "1" level on detection of a signal transition in the aforementioned embodiment as an example, logic "0" level may be generated in place of the logic "1" level. If this is applied to the driving circuit shown in FIGS. 7 and 14, in which the system of the controlling circuit part only is changed, a circuit diagram of the controlling circuit part in a case when this is applied to FIG. 14 is shown in FIG. 18. Signal assignment of the case when the system shown in FIG. 18 is employed is illustrated in TABLE 7, below.

TABLE 7

| input signal | | detecting signal | | controlling circuit output | | | | driving circuit output |
|---|---|---|---|---|---|---|---|---|
| Si(1) | Si(2) | d(1) | d(2) | chvdd | u(1) | u(2) | u(3) | |
| no | no | 1 | 1 | 0 | 0 | 1 | 1 | sig = Vref |
| no | yes | 1 | 0 | 1 | 0 | 1 | 0 | sig(=sig_c') > Vref |
| yes | no | 0 | 1 | 1 | 1 | 1 | 1 | sig(=sig_b') < Vref |
| yes | yes | 0 | 0 | 1 | 0 | 0 | 0 | sig(=sig_a') >> Vref |

*"no" denotes no signal transition, and "yes" denotes a signal transition.

In this case, signals identical to pulses shown in FIG. 1 are provided to the signal transmission line, and the reception circuit may be provided with the signal comparing part and the signal controlling part as shown in FIG. 17. Signal logic in the reception circuit is identical to the one shown in TABLE 6.

As has been explained, the signal transmission and reception device for a new wiring system of the present invention can simplify a circuit design compared to the background art multiple-valued logic circuit, by only improving a driving circuit and a reception circuit connecting between function blocks in an integrated circuit. The reduction of signal transmission lines facilitated by the improvement in the signal transmission and reception device, while not increasing an integrated circuit area significantly, allows to reduce an overall integrated circuit area. The reduction of wirings layers compared to the background art multi-layer wiring in as a method for high density device packing can simplify the fabrication process.

The smaller swing width of a transmissive signal with shorter rising and falling time periods of the signal allows application to a circuit operative at a fast speed. The transmission of signals in triangular pulses with small widths based on states of transition of the signals detected can reduce a power consumption significantly compared to the background art signal transmission in which power is supplied continuously.

It will be apparent to those skilled in the art that various modifications and variations can be made in the signal transmission and reception device for a new wiring system of the present invention without departing from the spirit or scope of the invention. Thus, it is intended that the present invention cover the modifications and variations of this invention provided they come within the scope of the appended claims and their equivalents.

What is claimed is:

1. A signal transmission and reception device for a wiring system, the wiring system being for transmission of data between a plurality of function blocks in an integrated circuit, the device comprising:
    one signal transmission line fitted between the function blocks for transmission of signals;
    a driving circuit that receives signals from a first plurality of the function blocks, converts combinations of transitions of the signals into encoded signals, and provides the encoded signal to the signal transmission line; and,
    a receiver that receives the encoded signal transmitted from the driving circuit through the signal transmission line, decodes the encoded signal into the first plurality of signals, and provides the first plurality of signals to another plurality of function blocks through a plurality of internal signal lines, wherein the driving circuit comprises,
        a signal detector that detects transitions of the first plurality of signals;
        a controller that provides a switching control signal and driving control signals in response to detecting signals from the signal transition detector;
        a signal driver that drives the signals such that a plurality of different signal levels occur on the signal transmission line in response to the driving control signals from the controller;
        a reference voltage generator that supplies a reference voltage to the signal transmission line; and
        a switching circuit that selectively supplies the reference voltage to the signal transmission line in response to the switching control signal from the controller.

2. A device as claimed in claim 1, wherein the signal detector includes a plurality of signal transition detectors corresponding to a plurality of input internal signal lines, each of the signal transition detectors having a delay that delays the signal and an exclusive OR operation circuit that subjects the signal and the signal delayed in the delay to exclusive OR operation.

3. A device as claimed in claim 1, wherein the signal driver includes $2^N-1$ signal driving elements in correspondence to N signals received through N internal signal lines, each either connected between the signal transmission line and a driving power source or between the signal transmission line and ground for charging current to the signal transmission line or discharging the current from the signal transmission line in response to the driving control signal.

4. A device as claimed in claim 3, wherein the driving control signals from the controller are signals for causing the plurality of different signal levels on the signal transmission line by controlling charging or discharging of the $2^N-1$ signal driving elements according to logic combinations of the detecting signals from the signal detector.

5. A device as claimed in claim 4, wherein the signal transmission line transmits the plurality of pulse signals of different levels higher or lower than the reference voltage from the reference voltage generator.

6. A device as claimed in claim 5, wherein the pulse signal is a triangular pulse.

7. A device as claimed in claim 1, wherein the switching control signal from the controller is at a first logic level in case when any one of the first plurality of signals is not involved in signal transition as a result of signal transition detection in the signal detector, and wherein the switching control signal from the controller is at a second reverse logic level to the first logic level when any one of the first plurality of signals is involved in signal transition as a result of the signal transition detection in the signal detector.

8. A device as claimed in claim 1, wherein a plurality of input internal signal lines are two, and the signal driver comprises:
    a first driving transistor having a gate for being applied of a third control signal from the controller, a source grounded, and a drain connected to the signal transmission line,
    a second driving transistor having a gate for being applied of a second driving control signal from the controller, a drain connected to the signal transmission line, and a source connected to the power source, and
    a third driving transistor having a gate for being applied of a third driving control signal from the controller, a drain connected to the signal transmission line, and a source connected to the power source.

9. A device as claimed in claim 8, wherein the signal detector provides a detecting signal of a logic "1" level on detection of a signal transition, and the controller comprises:
    a first logic circuit that subjects two detecting signals from the signal detector to NOR operation, to provide the switching control signal,
    a second logic circuit that subjects the two detecting signals to NAND operation to provide as a first driving control signal,
    a third logic circuit that inverts one of the two detecting signals to provide as a second driving control signal, and
    a fourth logic circuit that subjects a signal from the third logic circuit and the other one of the two detecting signals to NAND operation to provide as a third driving control signal.

10. A device as claimed in claim 8, wherein the signal detector provides a detecting signal of a logic "0" level on detection of a signal transition, and the controller comprises:

a first logic circuit that subjects two detecting signals from the signal transition detecting part to a first logic operation to provide as the switching control signal, a second logic circuit that subjects the two detecting signals to a second logic operation, a third logic circuit that inverts a signal from the second logic circuit, to provide as a second driving control signal, and a fourth logic circuit that subjects a signal from the second logic circuit and one of the two detecting signals to a third logic operation to provide as a first driving control signal, wherein the other one of the two detecting signals is provided as a third driving control signal.

11. A device as claimed in claim 1, wherein the receiver includes, a signal comparator that compares signal levels in the signal transmitted through the signal transmission line to a preset value, a signal controller that receives compared signals from the signal comparator and conducts logical operations to decode signal transitions of the first plurality of signals, and a signal forwarder that receives a signal decoded in the signal controller and restores the first plurality of signals received at the driving circuit.

12. A device as claimed in claim 11, wherein the signal comparator includes a plurality of comparing paths that compare the signal from the signal transmission line to different logic threshold values.

13. A device as claimed in claim 11, wherein the signal forwarder includes signal set and forwarders corresponding to the decoding signals from the signal controller in number each having asynchronous edge-triggered T flip-flop.

14. A device as claimed in claim 13, wherein the T flip-flop includes, a delay that delays a decoding signal from the signal controller, a logic operation circuit that receives the signal delayed in the delay and being fed back a signal from a signal latching circuit at a later stage and subjecting to exclusive OR operation, and the signal latching circuit that latches a signal from the logic operation circuit as a data signal using the decoding signal from the signal controller.

15. A device as claimed in claim 11, wherein the plurality of internal signal lines are two, and the signal comparator comprises:

a first comparing path having a differential amplifier that compares a signal to a reference signal, one invertor with a first threshold voltage, and another invertor for inverting a signal from the first threshold voltage invertor, a second comparing path having one invertor with a second threshold voltage, and an additional invertor for inverting a signal from the second threshold voltage invertor, and a third comparing path having a differential amplifier that compares the signal to the reference signal, and a invertor with a third threshold voltage.

16. A device as claimed in claim 15, wherein the signal controller comprises:

a first logic circuit that subjects signals from the first comparing path and the second comparing path to first logic operation, to provide a first decoding signal, and a second logic circuit that subjects signals from the second comparing path and the third comparing path to second logic operation, to provide a second decoding signal.

17. A device as claimed in claim 11, wherein, when the plurality of internal signal lines are two, the signal comparator comprises:

a first comparing path having a differential amplifier that compares the a signal to a reference voltage, and one invertor with a low logic threshold voltage, and another invertor for inverting a signal from the low logic threshold voltage invertor, a second comparing path having an invertor with a very high logic threshold voltage, and a third comparing path having a differential amplifier that compares the signal to the reference voltage, and an invertor with a high threshold voltage.

18. A device as claimed in claim 1, wherein the plurality of internal signal lines are two, and the signal driver comprises:

a first driving transistor having a gate for being applied of a first driving control signal from the controller, a source grounded, and a drain connected to the signal transmission line, a second driving transistor having a gate for being applied of a second driving control signal from the controller, a drain connected to the signal transmission line, and a source connected to the power source, and a third driving transistor having a gate for being applied of a third driving control signal, a drain connected to the signal transmission line, and a source grounded.

19. A device as claimed in claim 18, wherein the controller comprises:

a first logic circuit that subjects two detecting signals from the signal detector to NOR operation to provide the switching control signal, a second logic circuit that subjects the two detecting signals to NAND operation, a third logic circuit that inverts a signal from the second logic circuit, to provide the first driving control signal, and a fourth logic circuit that subjects the signal from the second logic circuit and one of the two detecting signals to NAND operation to provide as the third driving control signal, wherein the other one of the two detecting signals is provided as the second driving control signal.

20. A signal transmission and reception device for a wiring system, the wiring system being for transmission of data between a plurality of function blocks in an integrated circuit, the device comprising:

one signal transmission line fitted between the function blocks for transmission of signals;

a driving circuit that receives signals from a first plurality of the function blocks, converts combinations of transitions of the signals into an encoded signal, and provides the encoded signal to the signal transmission line; and a receiver that receives the encoded signal transmitted from the driving circuit through the signal transmission line, decodes the encoded signal into the first plurality of signals, and provides the first plurality of signals to another plurality of function blocks through a plurality of internal signal lines, wherein the receiver comprises,
  a signal comparator that compares signal levels in the encoded signal transmitted through the signal transmission line to a preset value,
  a signal controller that receives compared signals from the signal comparator and conducts logical operations to decode signal transitions of the first plurality of signals, and
  a signal forwarder that receives a signal decoded in the signal controller and restores the first plurality of signals received at the driving circuit, wherein the signal forwarder includes signal set and forwarders corresponding to the decoding signals from the signal controller in number each having a T flip-flop.

21. The device of claim 20, wherein the driving circuit comprises:
  a signal detector that detects the signal transitions of the first plurality of signals;
  a controller that provides a switching control signal and driving control signals in response to detecting signals from the signal transition detector;
  a signal driver that drives the signals such that a plurality of different signal levels occur on the signal transmission line in response to the driving control signals from the controller; and
  a switching circuit that selectively supplies a reference voltage to the signal transmission line in response to the switching control signal from the controller.

22. A signal transmission and reception device for a wiring system, the wiring system being for transmission of data between a plurality of function blocks in an integrated circuit, the device comprising:
  one signal transmission line fitted between the function blocks for transmission of signals;
  a driving circuit that receives signals from a first plurality of the function blocks, converts combinations of transitions of the signals into an encoded signal, and provides the encoded signal to the signal transmission line; and
  a receiver that receives the encoded signal transmitted from the driving circuit through the signal transmission line, decodes the encoded signal into the first plurality of signals, and provides the first plurality of signals to another plurality of function blocks through a plurality of two internal signal lines, wherein the receiver comprises,
    a signal comparator that compares signal levels in the encoded signal transmitted through the signal transmission line to a preset value, wherein the signal comparator comprises,
      a first comparing path having a differential amplifier that compares a signal to a reference signal, one invertor with a first threshold voltage, and another invertor for inverting a signal from the first threshold voltage invertor,
      a second comparing path having one invertor with a second threshold voltage, and an additional invertor for inverting a signal from the second threshold voltage invertor, and
      a third comparing path having a differential amplifier that compares the signal to the reference signal, and an invertor with a third threshold voltage;
    a signal controller that receives compared signals from the signal comparator and conducts logical operations to decode signal transitions of the first plurality of signals, wherein the signal controller comprises,
      a first logic circuit that subjects signals from the first comparing path and the second comparing path to a first logic operation to provide a first decoding signal, and
      a second logic circuit that subjects signals from the second comparing path and the third comparing path to a second logic operation to provide a second decoding signal, and
    a signal forwarder that receives a signal decoded in the signal controller and restores the first plurality of signals received at the driving circuit.

23. The device of claim 22, wherein wherein the driving circuit comprises:
  a signal detector that detects the signal transitions of the first plurality of signals;
  a controller that provides a switching control signal and driving control signals in response to detecting signals from the signal transition detector;
  a signal driver that drives the signals such that a plurality of different signal levels occur on the signal transmission line in response to the driving control signals from the controller; and
  a switching circuit that selectively supplies a reference voltage to the signal transmission line in response to the switching control signal from the controller, wherein the first and second logic operations are NAND operations.

* * * * *